United States Patent

[11] 3,626,208

[72] Inventor Richard T. Cooney
Salem, N.H.

[21] Appl. No. 868,010
[22] Filed Oct. 21, 1969
[45] Patented Dec. 7, 1971
[73] Assignee Bell Telephone Laboratories, Incorporated
Murray Hill, Berkeley Heights, N.J.

[54] DOUBLE-POLE DOUBLE-THROW DIODE SWITCH
6 Claims, 3 Drawing Figs.

[52] U.S. Cl. .......... 307/257,
307/259, 307/321, 307/244
[51] Int. Cl. .......... H03k 17/74
[50] Field of Search .......... 307/256,
243, 244, 254, 257, 259, 321

[56] References Cited

UNITED STATES PATENTS

| | | | |
|---|---|---|---|
| 2,906,891 | 9/1959 | Scanlon .......... | 307/254 |
| 3,011,129 | 11/1961 | Magleby et al. .......... | 307/257 |
| 3,027,524 | 3/1962 | May .......... | 307/255 |
| 3,171,044 | 2/1965 | Coffey .......... | 307/243 |
| 3,374,364 | 3/1968 | Concelman .......... | 307/241 |

*Primary Examiner*—Donald D. Forrer
*Assistant Examiner*—Harold A. Dixon
*Attorneys*—R. J. Guenther and E. W. Adams, Jr.

ABSTRACT: A reversing gate that allows the exchange of two radio frequency signal inputs between each of two outputs in response to a direct current switch command. Eight diodes are arranged in pairs in a bridge so that the ON pairs back bias OFF pairs thus simplifying the driving currents required. A plurality of gates can be compounded to achieve more complicated switching functions.

INVENTOR
R. T. COONEY
BY Ray M. Porter Jr.
ATTORNEY

DOUBLE-POLE DOUBLE-THROW DIODE SWITCH

BACKGROUND OF THE INVENTION

This invention relates to an electronic gate and, more particularly, to a high-frequency gate capable of interchanging two input circuits between each of two output circuits in the manner of a double-pole double-throw switch.

A large number of semiconductor gates have been proposed in the art that are suitable for switching a high-frequency signal path in response to a DC switching potential. Stripping each of these of their several embellishments, it will be found that the basic switch comprises a pair of oppositely poled semiconductor diodes connected in series between the input and output. A bipolar potential is usually required to switch the circuit. Thus, a suitably applied potential of one polarity forward biases both diodes thereby closing the switch, while a potential of the opposite polarity back biases both diodes to open the switch.

In one application of switches of this general type a standby channel is switched in and out of a communication system to increase the system reliability. For one-to-one protection or diversity, a switch having a double-pole double-throw capability is required. Obviously there are numerous combinations of pluralities of the above-described basic diode switch which would provide this capability. However, deriving and applying the several bipolar potentials needed to drive such a combination of basic switches becomes unduly complicated.

SUMMARY OF THE INVENTION

In accordance with the invention the driving current required for a gate having a double-pole double-throw capability is greatly simplified by arranging pairs of oppositely poled switching diodes in a four-arm bridge in such a way that the ON pairs automatically supply the back bias to the OFF pairs. The driving circuit is then required to deliver a potential that varies between zero and a single polarity value in order to effect the required "position" change in the switch. More particularly, the two inputs are connected, respectively, to diagonally opposite vertexes of the bridge and the two outputs to the remaining diagonally opposite vertexes. When one pair of opposite bridge arms is forward biased, the other pair is reverse biased and the switch is in one position. According to a principal feature of the invention, the forward bias current through the one pair is returned to the biasing source through impedances connected at each of the vertexes so that the voltage developed across these impedances automatically back biases adjacent pairs, thus eliminating the need for any further bias source for these OFF pairs. Removing the forward bias in the opposite arms, reverses the back bias in adjacent pairs and reverses the position of the switch. In a further embodiment it is shown how multiple bridges sharing a common arm may be compounded.

DETAILED DESCRIPTION

Figure 1:
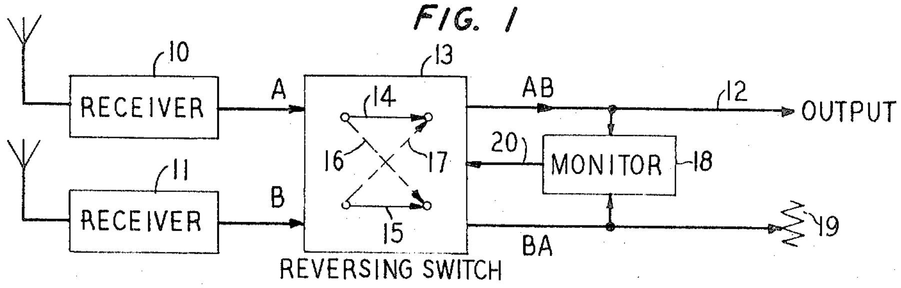
FIG. 1 is a simplified block diagram of a diversity system illustrating a typical application of a reversing switch in accordance with the invention.

For the purpose of illustrating the coupling properties of a switch in accordance with the invention, a typical application thereof is shown in FIG. 1. Thus, one of two diversity receiver inputs A and B to switch 13 from radio receivers 10 and 11, respectively, is to be connected to output 12 by switch 13 having primary switching paths 14 and 15 which apply signal A to output AB and the signal B to output BA. Switch 13 has secondary switch paths 16 and 17 which reverse these outputs. So long as monitor 18 detects a suitable A signal, switch 13 is allowed to remain in its primary switch position which treats the B signal as a standby and delivers it to dissipating load 19. However, if monitor 18 determines a failure in the A signal at a time when the B signal is satisfactory, switch 13 is commanded to switch to its secondary position by a suitable signal on lead 20 such that the B signal is delivered to output 12 and the defective A signal to load 19. This, of course, is a very simplified and rudimentary illustration of the nature of and the need for the double-pole double-throw capability of switch 13.

Figure 2:
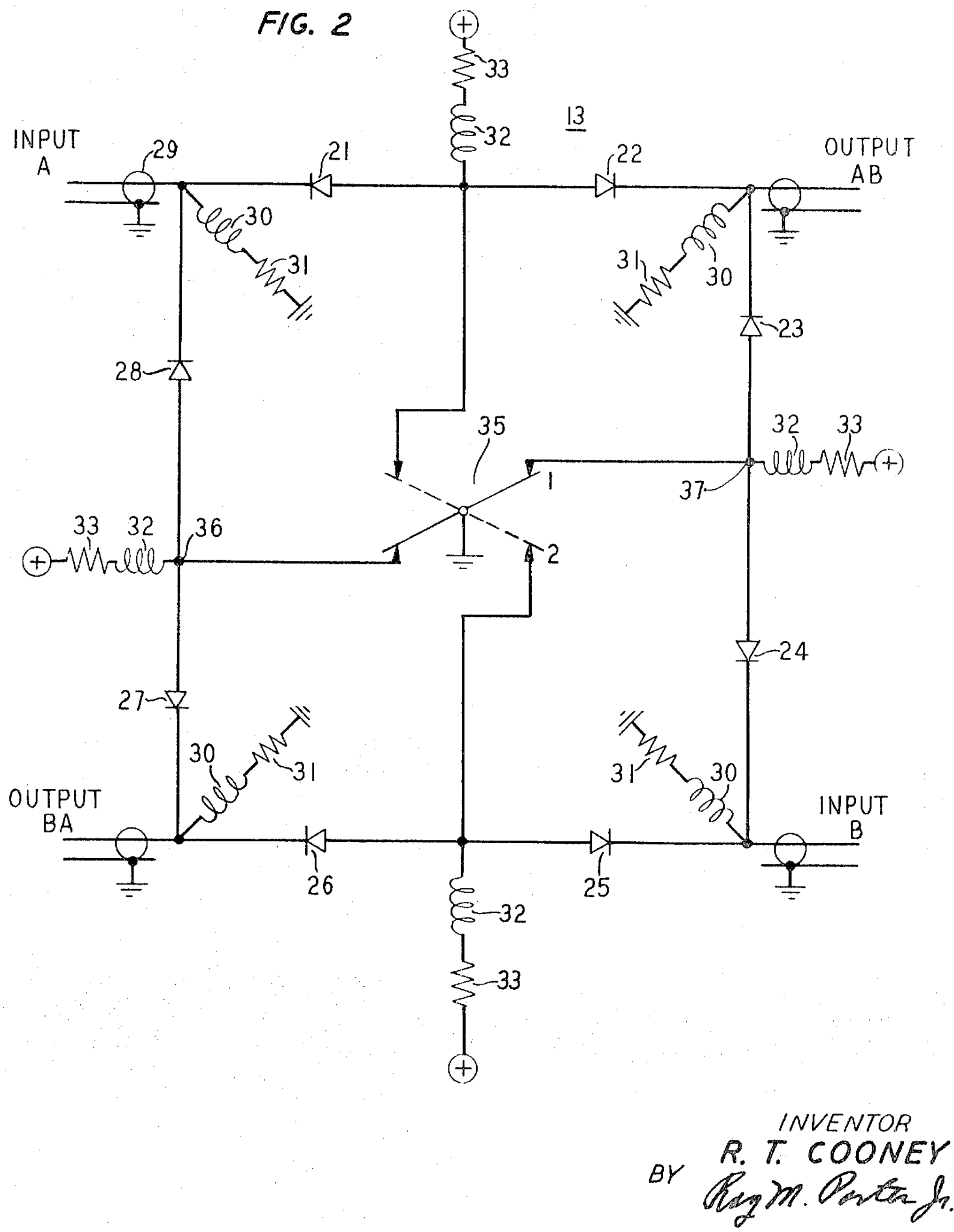
FIG. 2 is a schematic of a diode bridge forming a reversing switch of the type shown in FIG. 1 in accordance with the invention.

FIG. 2 illustrates the circuit details of switch 13 having input and output designations corresponding to those adopted in FIG. 1. The circuit comprises a four arm bridge network, each arm being identical and including a pair of asymmetrically conducting devices or diodes of the conventional rectifying type having like terminals connected together. The symbol used in the drawing indicates by its arrow the low resistance direction of current flow from a positive source through each device. For convenience here and in the appended claims, a bridge arm is understood to mean that portion of the bridge that extends between the points of connection to the input and output terminals, which points of connection will be referred to as the vertexes of the bridge. Thus, diodes comprising the pair in the arm between input A and output AB are designated 21 and 22, between AB and B as 23 and 24, between B and BA as 25 and 26, and between BA and A as 27 and 28. Each of the vertexes are illustrated as being connected to the center conductor of a coaxial transmission line such as 29 to illustrate the high-frequency nature of the circuit. A reactance having a high impedance to the radio-frequency signal and a significant impedance to direct current, such as inductor 30 and resistor 31 connected in series therewith, is connected from each vertex to ground.

The circuit is then completed by including means for selectively applying a forward biasing potential simultaneously to the diodes in one pair of opposite bridge arms such as 21, 22, 25 and 26 and for applying zero potential or ground to the center points such as 36 and 37 between diodes of the other pair of opposite bridge arms and for reversing the condition in the pairs of arms to reverse the switch. Obviously, many driving circuits can be designed which could supply these biases and the selection of one or another depends upon the way in which commands to the switch are derived in a particular application. If suitable pulses as specified are available, no further circuit means are required. For the purpose of illustration, however, the circuit of FIG. 2 is completed for a case in which the command signals to switch 13 are contained in the presence or absence of ground condition on leads connected to the center points. DC switch means 35 symbolically represents the origin of the required ground condition such that center points of one pair of opposite bridge arms are grounded in position 1 and the other pair of bridge arms are grounded in position 2. Each center point is also connected to forward biasing potential sources through inductors 32 having high impedances at the signal frequency, connected in series with current limiting resistors 33. The other pole of said potential source is grounded. Thus, when any center point is grounded, its potential is zero and the source voltage appears across its current limiting resistor 33. On the other hand, when any center point is ungrounded its potential rises to that of the source. For the diode polarity illustrated the potential source is positive but this source would be negative if all diodes were reversed in polarity. Obviously each contact of switch 35 could be replaced by the conduction path of a transistor, the control element of which is connected to respond to some other command signal. In such an application, a complimentary transistor could be included to simultaneously open the path through resistor 33 when a given center point is grounded to conserve biasing power.

Assuming that switch 35 is in position 1 as shown and grounds the center points between diodes 27–28 and 23–24, diodes 21–22 are forward biased by current from the positive source flowing through resistor 33, inductor 32, in parallel through diodes 21 and 22, and returning to the source through inductors 30 and resistors 31. Diodes 25 and 26 are similarly forward biased. Thus, a low resistance path is provided through ON diodes between input A and output AB and between input B and output BA, the primary paths through the switch. The voltage drop across each of resistors 31 back biases the adjacent diodes 23–24, 27 and 28 without requiring the application of any further biasing potential. This maintains a high impedance through the OFF diodes from each vertex to the grounded center point which opens the path between input A and output BA and between input B and output AB. When switch 35 is in position 2, diodes 23–24 and 27–28 comprise the ON pairs and diodes 21–22 and 25–26 the OFF pairs. Transmission is then between A and BA and between B and AB, the secondary paths through the switch.

Figure 3:
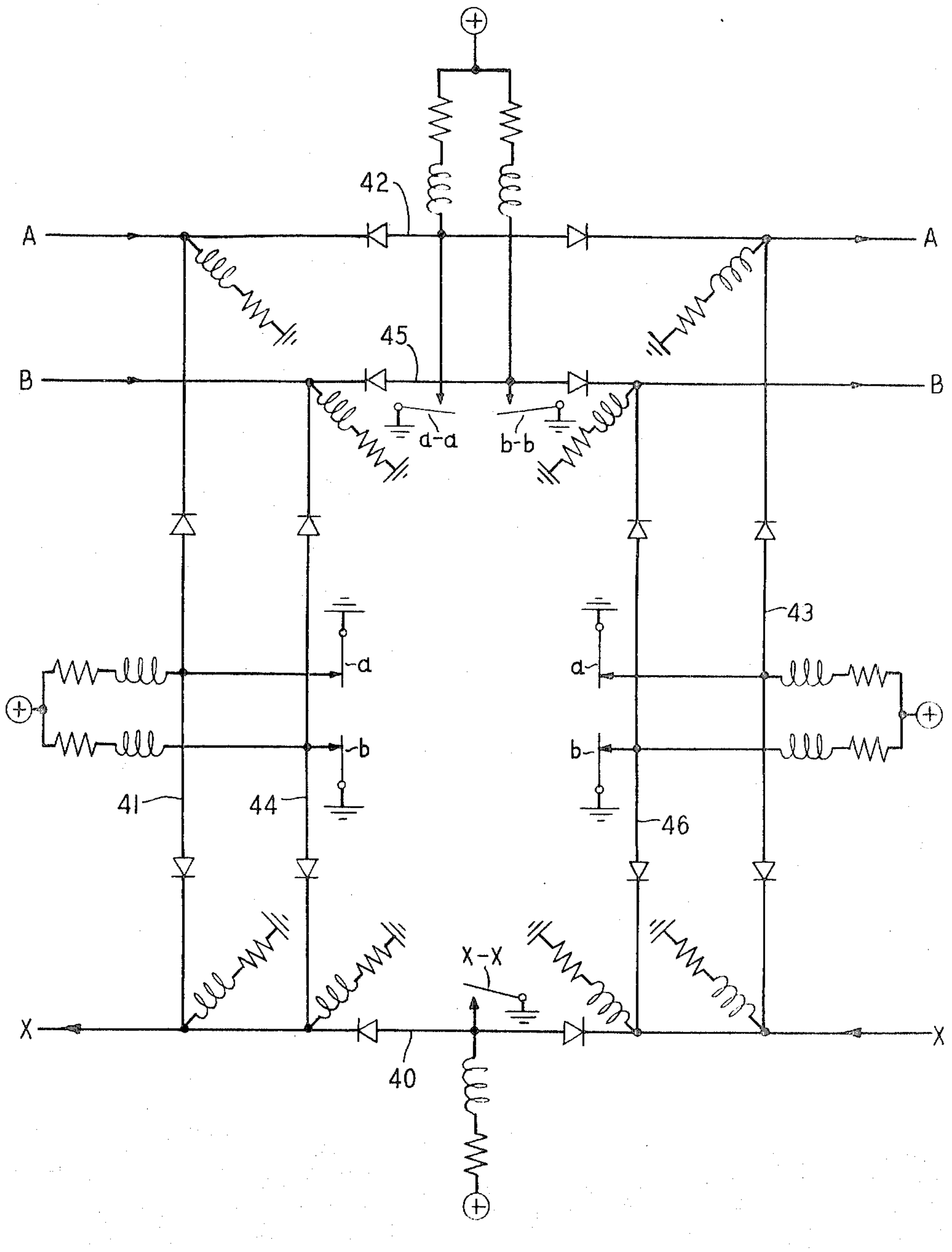
FIG. 3 is a schematic of a compound switch formed from two bridges of the type illustrated in FIG. 2.

FIG. 3 illustrates how switches in accordance with the invention may be compounded. The circuit of FIG. 3 may be analyzed by recognizing that either the four-arm bridge 40–41–42–43 or the four-arm bridge 40–44–45–46 thereof is identical to the bridge of FIG. 2 except that the two bridges share in common the arm 40. It will be convenient to designate the signal path through arm 40 as X—X and the paths through arms 42 and 45, respectively, as A—A and B—B. When the zero bias signals or grounds are applied to each of the arms 41, 43, 44 and 46 as represented by closing the switches *a* and *b* associated with the arms 41, 43, 44 and 46, each of the foregoing paths are coupled through the bridge without mutual interference. Path A—A and path B—B may, therefore, serve as regular communication channels while path X—X comprises a standby or protection channel. Operating the switches associated with opposite arms in various combinations produces several switching possibilities. For example, opening both switches *a* while simultaneously closing switches *a*— *a* and *x*—*x* associated with arms 42 and 40, respectively, will open paths A—A and X—X and connect A to X by arm 41 and X to A by arm 43. As in the embodiment of FIG. 1, forward currents through the diodes in arms 41 and 43 will back bias the diodes in adjacent arms 40 and 42 and also will back bias at least one of the diodes in adjacent arms 41 and 46. Thus, the path B—B is automatically locked out from the path X—X when path A—A is switched thereto. Other switching combinations are apparent. Furthermore, it should be noted that the compounding process illustrated by FIG. 3 can be extended indefinitely with three further arms connected to a previously formed bridge so that a new bridge is formed which shares one arm with the previous bridge.

What is claimed is:

1. A switching network comprising a bridge network having two pairs of opposite arms interconnecting four vertexes, a pair of oppositely poled asymmetrically conducting devices included in each arm, means for selectively applying a forward biasing potential simultaneously to both devices in each of one pair of said opposite arms, and impedance means connected from a common potential point to each of said vertexes for developing back bias potential for both devices in each of the other pair of opposite arms in response to said forward bias applied to said one pair of opposite arms.

2. The network of claim 1 including a pair of input circuits connected to diametrically opposite vertexes and a pair of output circuits connected to the remaining vertexes.

3. The network of claim 1 wherein said impedance means comprises the series combination of a resistor and inductor connected between each of said vertexes and the other pole of said potential source.

4. The network according to claim 1 in combination with at least three further bridge arms each like the arms of said network, said further arms being connected to one of the arms of said network to form a further four-arm bridge which shares said one arm with said network.

5. A switching network for connecting each of two input circuits alternatively to respective ones of two output circuits comprising a four-arm bridge network having four vertexes each connected to one of said circuits, each arm comprising a pair of asymmetrically conducting devices having like terminals connected together at a center point on the arm, means for selectively applying a forward biasing potential simultaneously to center points of opposite arms for both said devices in said opposite arms, and impedance means connected from a common potential point to each of said vertexes for developing back bias potential for both said devices in arms adjacent to said opposite arms in response to said forward bias applied to said opposite arms.

6. A switching network for connecting each of two input circuits alternatively to respective ones of two output circuits comprising a four-arm bridge network having four vertexes each connected to one of said circuits, each arm comprising a pair of asymmetrically conducting devices having like terminals connected together at a center point on the arm, a source of potential and impedance means for connecting said source to each of said center points, means for selectively grounding the center points of one pair of opposite arms, and impedance means connected from a common potential point to each of said vertexes for developing back bias potential for devices in said one pair of opposite arms in response to forward bias current flowing from said source through devices in the other pair of opposite arms.

* * * * *